(12) United States Patent
Schwarz et al.

(10) Patent No.: US 10,216,480 B2
(45) Date of Patent: Feb. 26, 2019

(54) SHIFT AND DIVIDE OPERATIONS USING FLOATING-POINT ARITHMETIC

(71) Applicant: International Business Machines Corporation, Armonk, NY (US)

(72) Inventors: Eric M. Schwarz, Gardiner, NY (US); Craig M. Slegel, Staatsburg, NY (US); Timothy J. Slegel, Staatsburg, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 52 days.

(21) Appl. No.: 15/417,472

(22) Filed: Jan. 27, 2017

(65) Prior Publication Data

US 2018/0217813 A1    Aug. 2, 2018

(51) Int. Cl.
   *G06F 7/491*    (2006.01)
   *G06F 7/483*    (2006.01)
   *G06F 7/535*    (2006.01)

(52) U.S. Cl.
   CPC ............. *G06F 7/483* (2013.01); *G06F 7/535* (2013.01)

(58) Field of Classification Search
   None
   See application file for complete search history.

(56) References Cited

U.S. PATENT DOCUMENTS

| 6,256,656 | B1* | 7/2001 | Gossett | G06F 7/729 |
| | | | | 708/491 |
| 8,402,078 | B2* | 3/2013 | Weinberg | G06F 7/535 |
| | | | | 708/490 |
| 2006/0064454 | A1 | 3/2006 | Wang et al. | |
| 2006/0129624 | A1 | 6/2006 | Abdallah et al. | |
| 2009/0216824 | A1* | 8/2009 | Weinberg | G06F 7/535 |
| | | | | 708/504 |
| 2012/0011185 | A1 | 1/2012 | Mohamed et al. | |
| 2018/0217813 | A1* | 8/2018 | Schwarz | G06F 7/483 |

* cited by examiner

*Primary Examiner* — David H Malzahn
(74) *Attorney, Agent, or Firm* — Cantor Colburn LLP; William A. Kinnaman, Jr.

(57) ABSTRACT

An aspect includes fetching a computer instruction, the fetching by an instruction fetch unit. It is determined that the instruction is a decimal divide instruction that specifies a decimal divisor and a decimal dividend. The decimal divisor is converted into a floating-point divisor and the decimal dividend is converted into a floating-point dividend. A floating-point division of the floating-point dividend by the floating-point divisor is performed by an instruction execution unit. It is determined that the floating-point division resulted in a quotient overflow. A reduced size floating-point dividend is generated based on the quotient overflow, the floating-point divisor, and the floating-point dividend. The floating point division of the reduced size floating-point dividend by the floating-point divisor is performed by the instruction execution unit, and a specified number of rightmost bits of the result is output as the quotient.

20 Claims, 6 Drawing Sheets

VSDP

SHIFT AND DIVIDE OPERATIONS USING FLOATING-POINT ARITHMETIC

BACKGROUND

The present invention relates generally to computer processing, and more specifically, to performing shift and divide operations on large numbers encoded in a decimal integer format by using floating-point arithmetic.

SUMMARY

Embodiments include a method, system, and computer program product for shift and divide operations using floating-point arithmetic. A method includes fetching a computer instruction, the fetching by an instruction fetch unit. It is determined that the instruction is a decimal divide instruction that specifies a decimal divisor and a decimal dividend. The decimal divisor is converted into a floating-point divisor and the decimal dividend is converted into a floating-point dividend. A floating-point division of the floating-point dividend by the floating-point divisor is performed by an instruction execution unit. It is determined that the floating-point division of the floating-point dividend by the floating-point divisor resulted in a quotient overflow. A reduced size floating-point dividend is generated based on the quotient overflow, the floating-point divisor, and the floating-point dividend. The floating point division of the reduced size floating-point dividend by the floating-point divisor is performed by the instruction execution unit, and a specified number of rightmost bits of the result is output as the quotient.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein include a method of performing division on large numbers encoded in a decimal integer format by using floating-point arithmetic. In accordance with one or more embodiments, the decimal numbers are converted into floating-point numbers, shift and divide operations are performed on the floating-point numbers, and the result(s) are converted back into decimal numbers. An instruction referred to herein as a Vector Shift and Divide Decimal (VSDP) instruction can be implemented to perform integer division of floating-point numbers in accordance with one or more embodiments described herein. The VSDP instruction can receive a 31-digit decimal number (i.e., a dividend), shift it left by up to 31 decimal digits (effectively creating a 62-digit dividend), and divide it by a 31-digit decimal number (i.e., a divisor). The result of the division is the rightmost 31 digits (i.e., the quotient). More than 31 digits can be present, but only the rightmost 31 digits are returned as the result. The VSDP instruction can be executed (for example) in hardware by a processor or by software instructions located on the processor. The VDSP instruction is typically used by a COBOL compiler for division operations of very large numbers. The COBOL language requires the results of these division operations to keep only the least-significant digits of the result with the high-order digits being truncated.

Figure 1:
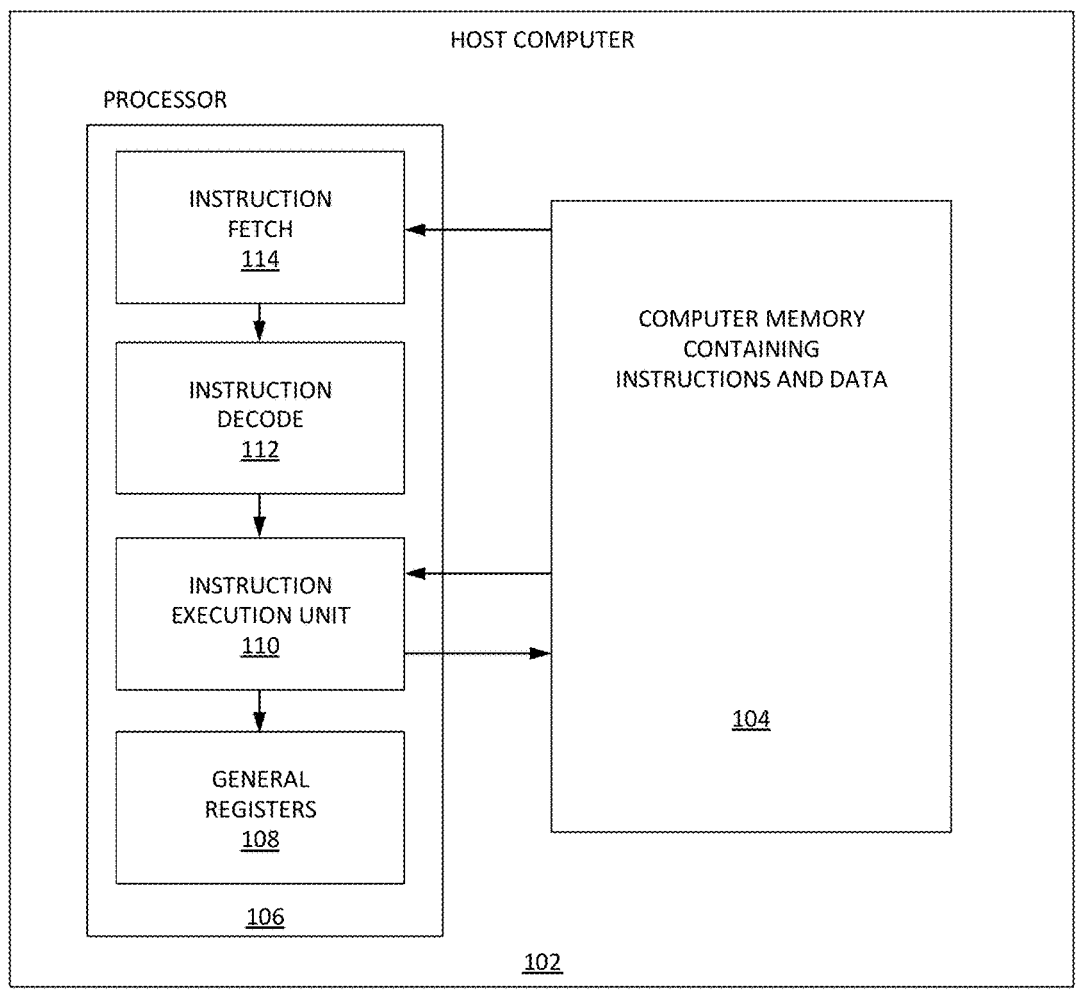
FIG. 1 illustrates a host computer for performing shift and divide operations using floating-point arithmetic when the input is in a decimal format in accordance with one or more embodiments.

Turning now to FIG. 1, a host computer 102 for performing shift and divide operations using floating-point arithmetic when the input is in a decimal format is generally shown in accordance with one or more embodiments. The host computer 102 in FIG. 1 includes a computer memory 104 for storing instructions and data. The host computer 102 also includes a processor 106 with an instruction fetch unit 114, and instruction decode unit 112, and instruction execution unit 110, and general registers 108. The instruction fetch unit 114 includes a mechanism for fetching instructions from the computer memory 104 and may also contain local buffering of these instructions it has fetched. In accordance with one or more embodiments, the raw instructions from the instruction fetch unit 114 are transferred to an instruction decode unit 112 which determines what type of instructions have been fetched. The instructions are executed by the instruction execution unit 110. The executing may include loading data into a general register 108 from the computer memory 104, storing data back to the computer memory 104 from a general register 108, or performing some type of arithmetic or logical operation. This exact type of operation to be performed has been previously determined by the instruction decode unit 112.

The VSDP instruction described herein can be executed on the host computer shown in FIG. 1. If the VSDP instructions are being executed natively on a computer system, then this diagram is complete as described above. However, if an instruction set architecture (ISA) that includes the VSDP instruction is being emulated on another computer, the above process would be implemented in software on the host computer 102. In this case, the above stated mechanisms would typically be implemented as one or more software subroutines within the emulator software. In both cases an instruction is fetched, decoded, and executed.

Figure 2:
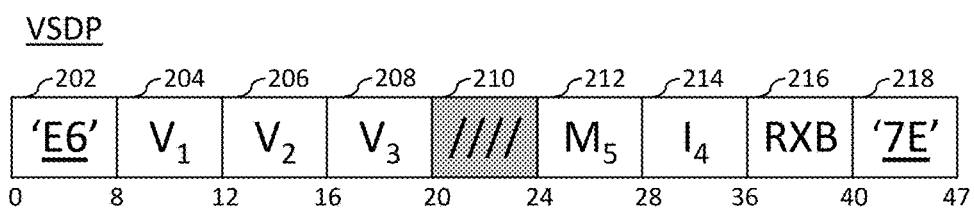
FIG. 2 illustrates a diagram of a format of a vector shift and divide decimal (VSDP) instruction for performing shift and divide operations using floating-point arithmetic when the input is encoded in a packed decimal format in accordance with one or more embodiments.

Turning now to FIG. 2, a diagram of a format of a VSDP instruction 200 for performing shift and divide operations using floating-point arithmetic when the input is encoded in a packed decimal format is generally shown in accordance with one or more embodiments. The second operand (the dividend) is in a vector register indicated by the concatenation of the second bit in the RXB field 216 and the $V_2$ field 206. The second operand shifted left by the number of digits (the shift amount) specified in the fourth operand, $I_4$ 214, is divided by the third operand (the divisor) which is in a vector register indicated by the concatenation of the third bit in the RXB field 216 and the $V_3$ field 208. The rightmost 31-digits of the quotient are placed in the first operand, which is in a vector register indicated by the concatenation of the first bit in the RXB field 216 and the $V_1$ field 204. The operands and the result are in the signed-packed-decimal format. The sign codes may be modified for use in the operation by force operand two positive (P2), which is the first bit of the M5 field 212, and force operand three positive (P3) controls, which is the second bit of the M5 field 212.

In accordance with one or more embodiments of the VSDP instruction 200, all digit codes are checked for validity. The sign codes are checked for validity unless overridden by the P2 or P3 controls. If operand one cannot contain all leftmost nonzero digits of the quotient, decimal overflow occurs. The operation is completed. The result is obtained by ignoring the overflow digits, and if the condition code set (CS) flag which is the fourth bit in the $M_5$ field 212 is one, the condition code (CC) is set. If the decimal-overflow mask is one, a program interrupt for decimal overflow occurs.

When the rightmost 31 digits of the quotient are nonzero and the force operand one positive (P1) control, which is the third bit in the M5 field 212, is zero, rules of algebra from the dividend and divisor signs determine the sign of the result and a preferred sign code is used. When the rightmost thirty one digits of the quotient are zero and the P1 control is zero, the sign of the result is made positive with preferred sign code "1100." When the P1 control is one, the sign of the result is made positive with sign code "1111."

If the divisor is zero and the divisor sign code used is valid, a decimal divide exception is recognized. This includes the case of division of zero by zero. The divisor sign code used is the third operand sign code when the P3 bit is zero, and is a positive sign code when the P3 bit is one.

In accordance with one or more embodiments, the fourth operand, $I_4$ 214 as shown in FIG. 2, includes reserved bits 0-2 which contain zeros, and shift amount bits 3-7 which contain an unsigned binary number specifying the number of digits that $V_2$ 206 is shifted left to form the dividend.

In accordance with one or more embodiments, the fifth operand in the M5 field 212 as shown in FIG. 2 includes a P2 bit, a P3 bit, a P1 bit, and a CS bit. In accordance with one or more embodiments, when the P2 bit is one, the operand two sign is treated as a positive sign and is not checked for validity, and when it is zero, the operand two sign is used in the operation and is checked for validity. Similarly, when the P3 bit is one, the operand three sign is treated as a positive sign and is not checked for validity, and when it is zero, the operand three sign is used in the operation and is checked for validity. In accordance with one or more embodiments, when the P1 bit is one, the sign of the result placed in operand one is forced to positive and a sign code of "1111" is used, and when the bit is zero, the sign of the result placed in the operand one is the preferred sign code for the sign of the quotient.

In accordance with one or more embodiments, when the CS is zero, the condition code is not set and remains unchanged. When the CS is one, the condition code is set as follows: "0" result zero, no overflow; "1" result less than zero, no overflow; "2" result greater than zero, no overflow; and "3" overflow.

The remaining two fields in the VSDP instruction text 'E6' 202 and '7E' 218 make up the opcode, or machine code, indicating that this is a VSDP instruction. As shown in the embodiment in FIG. 2, the field 210 with '////' is a reserved field which is set to zero and reserved for other values for future expansion.

An example in accordance with one or more embodiments of performing shift and divide operations using floating-point arithmetic when the input is encoded in a packed decimal format follows. For simplicity, the example uses 4-digit decimal numbers (instead of 31-digit numbers for the full VSDP instruction) and requires 4 decimal digits of accuracy (instead of 31 decimal digits for the full VSDP instruction). It is noted that decimal floating-point-extended (DFP-extended) provides 34 digits, and therefore it can support the 31 decimal digits of the VSDP instruction. In addition, DFP arithmetic can be done using truncation (round toward zero rounding mode). In this example:

Dividend=8752
Shift amount=3
Divisor=0017
A trial division in DFP arithmetic is performed:

$$(8752*10^3)/17=514823.52\ldots$$

In this example, the quotient is too large (more than 4 digits to left of decimal point) by $51*10^4$. Therefore, as shown below, this amount is multiplied by the divisor and then the result is subtracted from the dividend to make the dividend smaller for the final division operation. It should be noted that this entire calculation is performed with DFP numbers.

$$(51*10^4)*17=867*10^4$$

$$(8752*10^3)-(867*10^4)=82000$$

The final DFP division is performed using the reduced dividend:

$$(82000/17)=4823.5294\ldots$$

Note that the integer portion of this is identical to the least-significant 4 digits of the original division which is what is saved as the VSDP result. The result is truncated to an integer, and the DFP number is converted back to packed decimal format. As described below in reference to FIG. 5, a similar method can be used for performing division of binary integers using binary floating-point (BFP) arithmetic.

Figure 3:
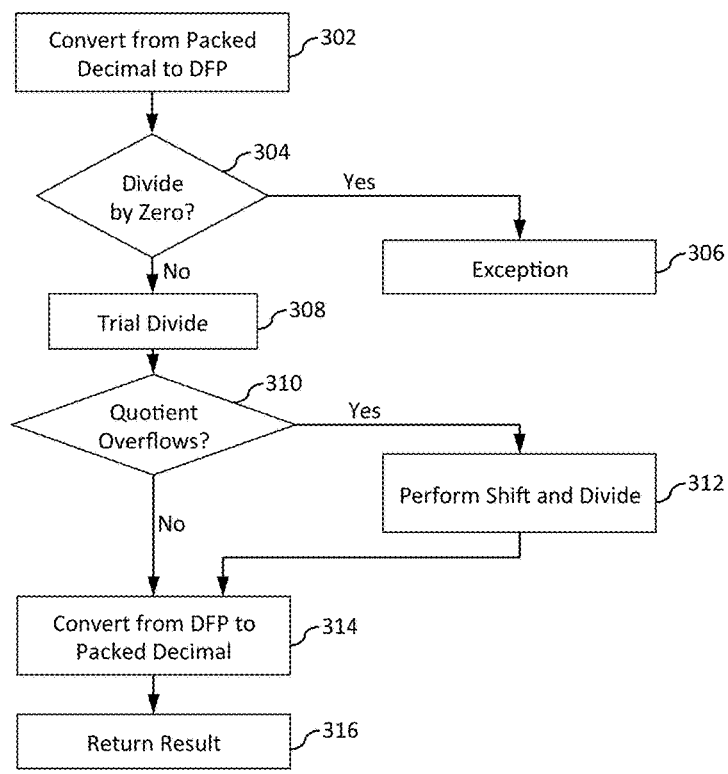
FIG. 3 illustrates a flow diagram of processing by a VSDP instruction for performing shift and divide operations using floating-point arithmetic when the input is encoded in a packed decimal format in accordance with one or more embodiments.

Turning now to FIG. 3, a flow diagram 300 of processing by a VSDP instruction for performing shift and divide operations using floating-point arithmetic when the input is encoded in a packed decimal format is generally shown in accordance with one or more embodiments. At block 302, a dividend in a packed decimal format and a divisor in a packed decimal format are received, and converted into DFP. At block 304 it is determined if the divisor is equal to zero, and block 306 returns an exception if the divisor is zero. Otherwise, processing continues at block 308, and a trial divide is performed and an overflow check is performed at block 310. In accordance with one or more embodiments, the trial divide includes a division in floating-point which provides a greater precision than needed and provides means for detecting whether there is an overflow. Based on determining that trial divide results in the quotient overflowing, that is that the division operation results in a quotient that includes more than 31 digits to the left of the decimal point, block 312 is performed.

Figure 4:
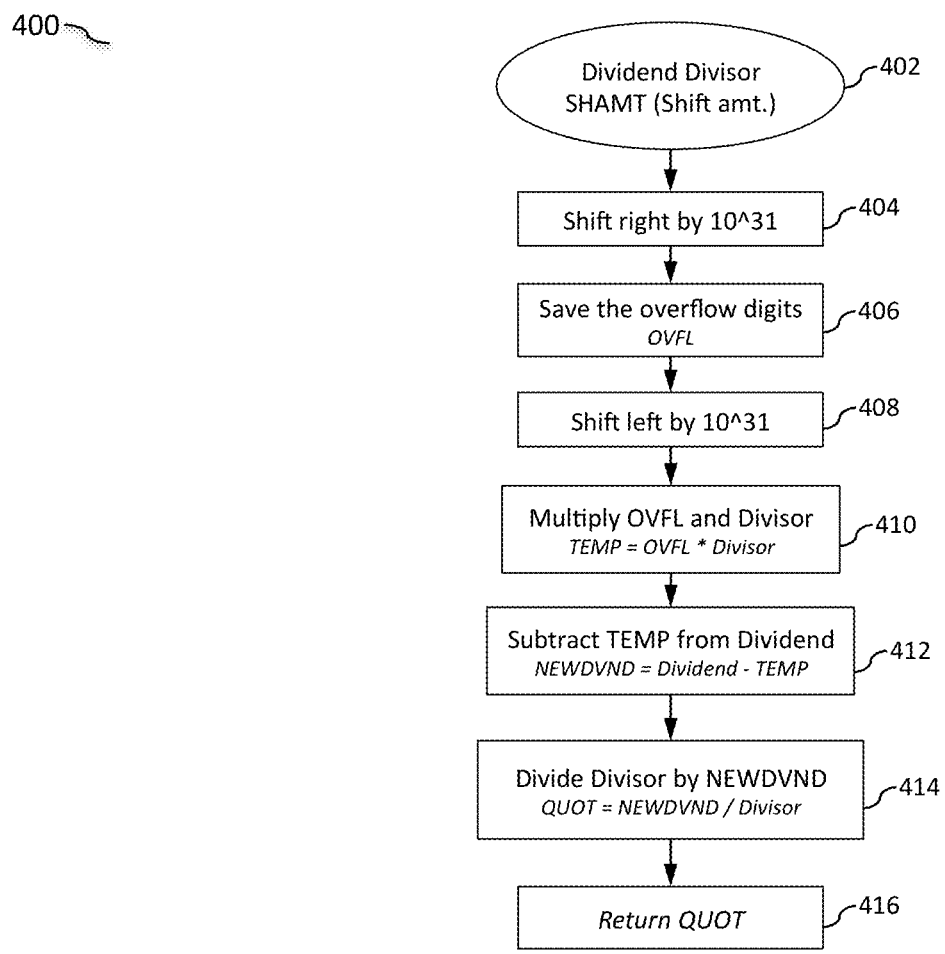
FIG. 4 illustrates a flow diagram of processing by a VSDP instruction to perform shift and divide operations using floating-point arithmetic when the input is encoded in a packed decimal format in accordance with one or more embodiments.

At block 312, the processing described below in reference to FIG. 4 is initiated to avoid the overflow by reducing the size of the dividend and then performing the division on the reduced size dividend. Processing continues at block 314 once block 312 is completed. If it is determined, at block 310, that the quotient does not overflow, then processing continues at block 314 and block 312 is skipped. At block 314, the result of the division is converted from DFP to packed decimal, and at block 316 the result is returned. In one or more embodiments, additional processing is performed by the VSDP instruction to set sign bits and condition codes as described previously.

Turning now to FIG. 4, a flow diagram 400 of processing performed by a VSDP instruction to perform the processing shown in block 312 of FIG. 3 to reduce the size of the dividend to avoid an overflow condition is generally shown in accordance with one or more embodiments. At block 402, the dividend, divisor, and quotient (from block 308 of FIG. 3) in DFP format, as well as a shift amount (SHAMT) of the dividend are received. At block 404, a right shift operation is performed on the quotient for clearing all digits which did not overflow for the dividend, and at block 406 the overflow digits (OVFL) are saved.

In accordance with one or more embodiments, the processing performed at block 404 can be performed by the following code, which as shown is written in z/Architecture® Assembler, though code in other languages could also be implemented, which includes a fast way to multiply by $10^{-31}$:

EEXTR MR11, F12
AGHI MR11, −31
IEXTR F12, F12, MR11

In accordance with one or more embodiments, the processing performed at block 406 can be performed by the following code which saves only the overflow digits:

FIXTR F12, 5, F12, 0

At block 408, the overflow digits are shifted left by the shift value specified by the VSDP instruction (for instance, a SHAMT of 31 digits). In accordance with one or more embodiments, the processing performed at block 408 can be performed by the following code which includes a fast way to multiply by $10^{31}$:

LGHI MR11, 31+6176
IEXTR F12, F12, MR11

At block 410, the saved overflow (OVFL) digits are multiplied with the divisor to obtain an intermediate value (TEMP). In accordance with one or more embodiments, the processing performed at block 410 can be performed by the following code:

MXTR F12, F12, F1

At block, 412, the intermediate value (TEMP) is deducted from the dividend to yield a new dividend (NEWDVND). In accordance with one or more embodiments, the processing performed at block 412 can be performed by the following code:

SXTR F0, F0, F12

At block 414, a division is performed with the new dividend (NEWDVND) and divisor to obtain a quotient (QUOT). In accordance with one or more embodiments, the processing performed at block 414 can be performed by the following code:

DXTR F12, F0, F1

At block 416, the quotient is returned. In addition, the quotient (QUOT) can be truncated to an integer value and presented as a result of division.

As described previously, if there was no overflow on the initial trial divide that was performed in block 308 of FIG. 3, then the processing described in FIG. 4 is not performed. This is because the trial divide already provides the correct and valid quotient that is trying to be determined.

In the process described above in FIG. 4, the shift right at block 404 allows for the clearing of all digits that did not overflow. Shifting to the left again at block 408 allows the "capture" of the overflowed digits of the quotient in order to then reduce the size of the dividend to a value that will not overflow when the divide operation is repeated at block 414. The processing shown in FIG. 3 and FIG. 4 allow the use of DFP arithmetic instructions to perform BCD decimal division.

Embodiments described herein can also be used to perform division of binary integers using BFP arithmetic instructions. In accordance with one or more embodiments, the binary integer dividend and divisor are converted to BFP. The mantissa precision of the BFP format must be greater than the number of integer binary bits desired. If required, the dividend is multiplied by a power of ten. A trial division is performed and it is determined whether the trial division overflows. If the trial division does not result in an overflow, then the quotients can be contained in the binary integer format and the BFP quotient is converted back to the binary integer format and the processing of the division is completed. If the trial division does result in an overflow, then the processing shown in FIG. 5 can be performed to reduce the size of the dividend.

Figure 5:
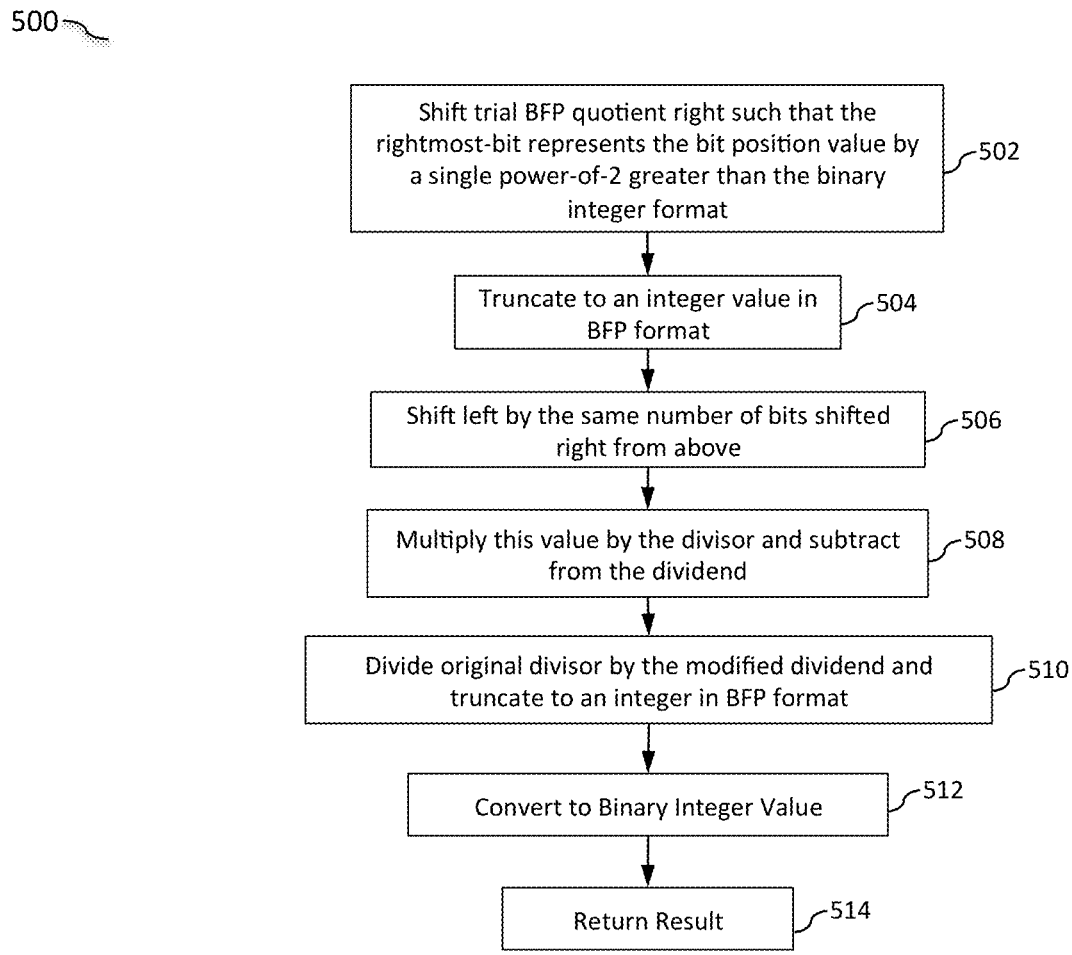
FIG. 5 illustrates a flow diagram of processing to perform shift and divide operations using floating-point arithmetic when the input is encoded in a binary integer format in accordance with one or more embodiments.

Turning now to FIG. 5, a flow diagram 500 of processing to perform shift and divide operations using floating-point arithmetic when the input is encoded in a binary integer format is generally shown in accordance with one or more embodiments. All arithmetic operation described in FIG. 5 are performed on numbers that are in BFP format. At block 502, the trial BFP quotient is shifted right such that the rightmost-bit represents the bit position value by a single power-of-2 greater than the binary integer format, and at block 504, the right shifted BFP trial quotient is truncated to an integer value in BFP format. At block 506, the truncated and right shifted BFP trial quotient is shifted left by the same number of bits that it was shifted right at block 502. At block 508, the resulting value is multiplied by the divisor and subtracted from the dividend to generate a modified dividend. Processing continues at block 510, where the original divisor is divided by the modified dividend, and the result (the quotient) is truncated to an integer in BFP format. At block 512, the result generated at block 510 is converted to a binary integer value, and at block 514, the result is returned. In accordance with one or more embodiments, if the integer division is to be performed on signed integers, as opposed to unsigned integers, further manipulations may be necessary to convert the final value to two's complement arithmetic.

One or more embodiments described herein allow for division of very large numbers to be carried out significantly faster than any type of traditional restoring division. In particular, one of more embodiments can be the most effective when there is overflow of the quotient.

One or more embodiments can be implemented for any number of digits. In the IBM z/Architecture, the packed decimal format uses thirty-one digits, but other architectures could have a different number of digits. Therefore, the overflow amount could be different depending on the architecture. One or more embodiments can be implemented when there are a large numbers of digits, when there are many digits that have overflowed.

In accordance with one or more embodiments, native hardware instructions (e.g., millicode) can be used when performing DFP and BFP arithmetic to speed up the division processing. Millicode can include vertical microcode that executes on a processor.

Figure 6:
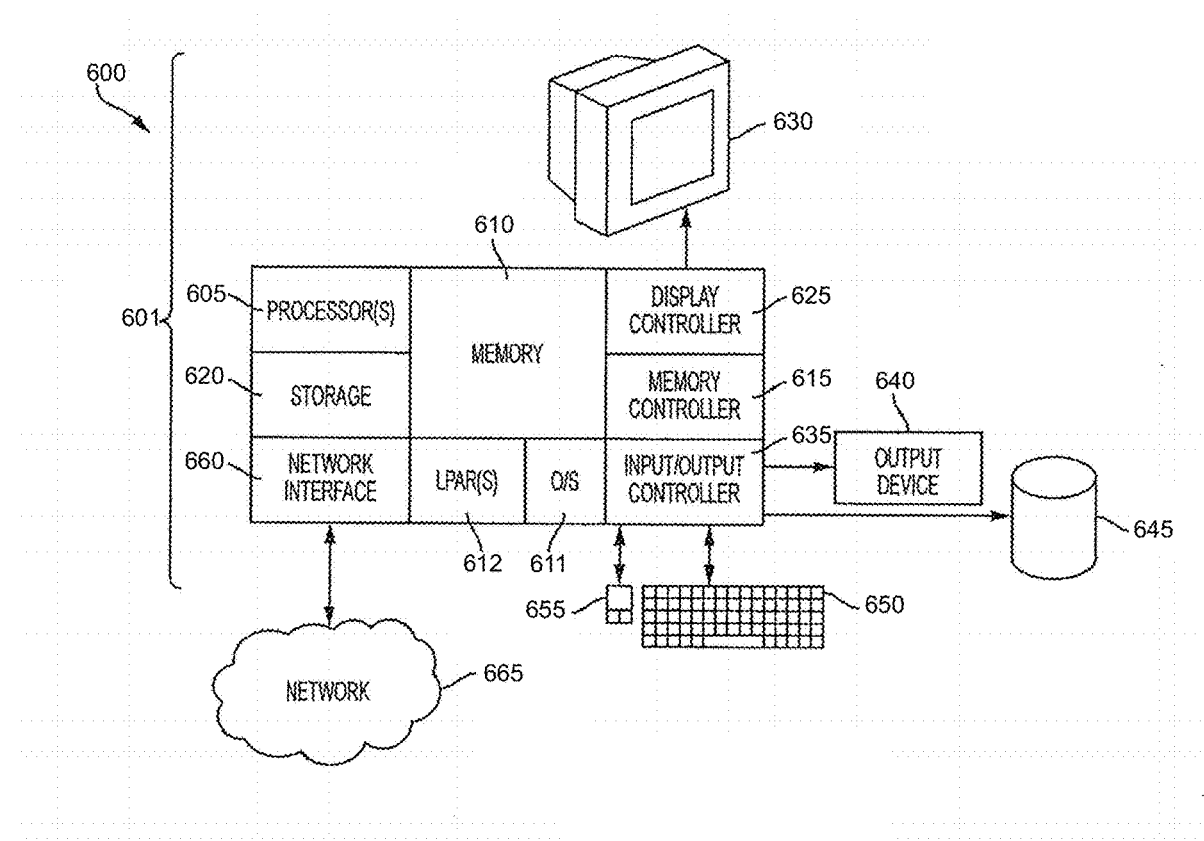
FIG. 6 illustrates a computer system for performing shift and divide operations using floating-point arithmetic when the input is in decimal format in accordance with one or more embodiments.

Turning now to FIG. 6, a computer system for performing shift and divide operations using floating-point arithmetic when the input is in a decimal format is generally shown in accordance with one or more embodiments. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 600 therefore may include general-purpose computer or mainframe 601 capable of running multiple instances of an O/S simultaneously.

In an exemplary embodiment, in terms of hardware architecture, as shown in FIG. 6, the computer 601 includes one or more processors 605, memory 610 coupled to a memory controller 615, and one or more input and/or output (I/O) devices 640, 645 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 635 may include a plurality of sub-channels configured to access the output devices 640 and 645. The sub-channels may include fiber-optic communications ports.

The processor 605 is a hardware device for executing software, particularly that stored in storage 620, such as cache storage, or memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the processor 605.

The instructions in memory 610 may include one or more separate programs, each of which comprises an ordered listing of executable instructions for implementing logical functions. In the example of FIG. 6, the instructions in the memory 610 a suitable operating system (OS) 611. The operating system 611 essentially controls the execution of other computer programs and provides scheduling, input-output control, file and data management, memory management, and communication control and related services.

The memory 610 may include multiple logical partitions (LPARs) 612, each running an instance of an operating system. The LPARs 612 may be managed by a hypervisor, which may be a program stored in memory 610 and executed by the processor 605.

In an exemplary embodiment, a conventional keyboard 650 and mouse 655 can be coupled to the input/output controller 635. Other output devices such as the I/O devices 640, 645 may include input devices, for example but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630. In an exemplary embodiment, the system 600 can further include a network interface 660 for coupling to a network 665. The network 665 can be an IP-based network for communication between the computer 601 and any external server, client and the like via a broadband connection. The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the instructions in the memory 610 may further include a basic input output system (BIOS) (omitted for simplicity). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute instructions stored within the memory 610, to communicate data to and from the memory 610, and to generally control operations of the computer 601 pursuant to the instructions.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a memory having computer readable instructions; and
a processor comprising an instruction fetch unit, an instruction decode unit, and an instruction execution unit, the processor configured for:
fetching, by the instruction fetch unit, an instruction from the memory;
determining, by the instruction decode unit, that the instruction is a decimal divide instruction that specifies a decimal divisor and a decimal dividend;
converting, by the instruction execution unit, the decimal divisor into a floating-point divisor and the decimal dividend into a floating-point dividend;
performing, by the instruction execution unit, a floating-point division of the floating-point dividend by the floating-point divisor;
determining, by the instruction execution unit, that the floating-point division of the floating-point dividend by the floating-point divisor causes a quotient overflow;
generating, by the instruction execution unit, a reduced size floating-point dividend based on the quotient overflow, the floating-point divisor, and the floating-point dividend;
performing, by the instruction execution unit, the floating-point division of the reduced size floating-point dividend by the floating-point divisor; and
outputting, by the instruction execution unit, as a quotient, a specified number of rightmost bits of a result of the floating-point division of the reduced size floating-point dividend by the floating-point divisor.

2. The system of claim 1, wherein generating the reduced size floating-point dividend includes:
shifting the quotient overflow left by the specified number;
calculating a product of the shifted left quotient overflow and the floating-point divisor; and
subtracting the product from the floating-point dividend.

3. The system of claim 1, wherein the quotient is in a floating-point format and the instructions further include converting the quotient into a decimal format.

4. The system of claim 1, wherein the specified number is thirty-one.

5. The system of claim 1, wherein the decimal divisor and the decimal dividend are in a packed decimal format, and the floating-point divisor and the floating-point dividend are in a decimal floating-point format.

6. The system of claim 1, wherein the decimal divisor and the decimal dividend are in a binary integer format, and the floating-point divisor and the floating-point dividend are in a binary floating-point format.

7. The system of claim 1, wherein the decimal divisor and the decimal dividend are fetched from a location selected from the group consisting of the memory and a register.

8. The system of claim 1, wherein the outputting includes storing the result in a location selected from the group consisting of the memory and a register.

9. A computer-implemented method comprising:
fetching a computer instruction, the fetching by an instruction fetch unit;
determining, by an instruction decode unit, that the instruction is a decimal divide instruction that specifies a decimal divisor and a decimal dividend;
converting, by an instruction execution unit, the decimal divisor into a floating-point divisor and the decimal dividend into a floating-point dividend;
performing, by the instruction execution unit, a floating-point division of the floating-point dividend by the floating-point divisor;
determining, by the instruction execution unit, that the floating-point division of the floating-point dividend by the floating-point divisor resulted in a quotient overflow;
generating, by the instruction execution unit, a reduced size floating-point dividend based on the quotient overflow, the floating-point divisor, and the floating-point dividend;
performing, by the instruction execution unit, the floating-point division of the reduced size floating-point dividend by the floating-point divisor, and
outputting, by the instruction execution unit, as a quotient, a specified number of rightmost bits of a result of the floating-point division of the reduced size floating-point dividend by the floating-point divisor.

10. The method of claim 9, wherein generating the reduced size floating-point dividend includes:
shifting the quotient overflow left by the specified number;
calculating a product of the shifted left quotient overflow and the floating-point divisor; and
subtracting the product from the floating-point dividend.

11. The method of claim 9, wherein the quotient is in a floating-point format and the instructions further include converting the quotient into a decimal format.

12. The method of claim 9, wherein the specified number is thirty-one.

13. The method of claim 9, wherein the decimal divisor and the decimal dividend are in a packed decimal format, and the floating-point divisor and the floating-point dividend are in a decimal floating-point format.

14. The method of claim 9, wherein the decimal divisor and the decimal dividend axe in a binary integer format, and the floating-point divisor and the floating-point dividend are in a binary floating-point format.

15. The method of claim 9, wherein the decimal divisor and the decimal dividend are fetched from a location selected from the group consisting of the memory and a register.

16. The method of claim 9, wherein the outputting includes storing the result in a location selected from the group consisting of the memory and a register.

17. A computer program product comprising a non-transitory computer readable storage medium having program instructions embodied therewith, the program instructions executable by processing circuitry to cause the processing circuitry to perform:

fetching a computer instruction, the fetching by an instruction fetch unit;

determining, by an instruction decode unit, that the instruction is a decimal divide instruction that specifies a decimal divisor and a decimal dividend;

converting, by an instruction execution unit, the decimal divisor into a floating-point divisor and the decimal dividend into a floating-point dividend;

performing, by the instruction execution unit, a floating-point division of the floating-point dividend by the floating-point divisor;

determining, by the instruction execution unit, that the floating-point division of the floating-point dividend by the floating-point divisor resulted in a quotient overflow;

generating, by the instruction execution unit, a reduced size floating-point dividend based on the quotient overflow, the floating-point divisor, and the floating-point dividend;

performing, by the instruction execution unit, the floating-point division of the reduced size floating-point dividend by the floating-point divisor; and outputting, by the instruction execution unit, as a quotient, a specified number of rightmost bits of a result of the floating-point division of the reduced size floating-point dividend by the floating-point divisor.

18. The computer program product of claim 17, wherein generating the reduced size floating-point dividend includes:

shifting the quotient overflow left by the specified number;

calculating a product of the shifted left quotient overflow and the floating-point divisor; and subtracting the product from the floating-point dividend.

19. The computer program product of claim 17, wherein the decimal divisor and the decimal dividend are in a packed decimal format, and the floating-point divisor and the floating-point dividend are in a decimal floating-point format.

20. The computer program product of claim 17, wherein the decimal divisor and the decimal dividend are in a binary integer format, and the floating-point divisor and the floating-point dividend are in a binary floating-point format.

* * * * *